United States Patent
Abdoli et al.

(10) Patent No.: US 10,098,121 B2
(45) Date of Patent: Oct. 9, 2018

(54) ITERATIVE RECEIVER AND METHODS FOR DECODING UPLINK WIRELESS COMMUNICATIONS

(71) Applicants: Javad Abdoli, Ottawa (CA); Ming Jia, Ottawa (CA); Jianglei Ma, Ottawa (CA)

(72) Inventors: Javad Abdoli, Ottawa (CA); Ming Jia, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 15/055,146

(22) Filed: Feb. 26, 2016

(65) Prior Publication Data

US 2017/0251479 A1 Aug. 31, 2017

(51) Int. Cl.
*H04B 7/216* (2006.01)
*H04W 72/04* (2009.01)
*H04W 74/08* (2009.01)
*H04J 13/00* (2011.01)

(52) U.S. Cl.
CPC ..... *H04W 72/0466* (2013.01); *H04J 13/0003* (2013.01); *H04W 72/0413* (2013.01); *H04W 74/0825* (2013.01)

(58) Field of Classification Search
CPC ................................................ H04W 72/0466
See application file for complete search history.

(56) References Cited

U.S. PATENT DOCUMENTS

| | | | | |
|---|---|---|---|---|
| 2010/0122143 A1* | 5/2010 | Lee | ..................... | H03M 13/1117 714/752 |
| 2011/0010602 A1* | 1/2011 | Chung | ............... | H03M 13/1134 714/752 |
| 2013/0272444 A1* | 10/2013 | Barron | ................ | H03M 13/036 375/295 |
| 2014/0140360 A1* | 5/2014 | Nikopour | ................ | H04J 13/00 370/479 |

(Continued)

FOREIGN PATENT DOCUMENTS

| | | |
|---|---|---|
| CN | 104823384 A | 8/2015 |
| CN | 105306175 A | 2/2016 |
| WO | 2014075637 A1 | 5/2014 |

*Primary Examiner* — Gerald A Smarth

(57) ABSTRACT

Methods and devices are disclosed for decoding multiple sparsely encoded data sequences in a wireless communications network. A received signal carrying multiple sparsely encoded data sequences is decoded by selecting a first plurality of the data sequences and performing multi-user decoding on the received signal to decode the first plurality of data sequences. Other data sequences are treated as noise. The plurality of data sequences is selected to meet a collision threshold for the multi-user decoding. Data sequences may be selected based on a collision contribution and signal quality metrics. A modified received signal is generated to remove signals associated with the multiple sparsely encoded data sequences which have been successfully decoded. The method may be performed for additional iterations to select a new plurality of data sequences, and perform the multi-user decoding on the modified received signal to decode additional data sequences, until a stopping condition is met.

22 Claims, 5 Drawing Sheets

(56) References Cited

U.S. PATENT DOCUMENTS

2014/0369434 A1* 12/2014 Taherzadehboroujeni ................... H04B 7/0456 375/261
2015/0282185 A1* 10/2015 Nikopour .............. H04L 1/0002 370/329
2016/0227463 A1* 8/2016 Baligh .................. H04W 40/02

* cited by examiner

ITERATIVE RECEIVER AND METHODS FOR DECODING UPLINK WIRELESS COMMUNICATIONS

TECHNICAL FIELD

The present application relates to wireless communications, and specifically, methods and systems for receiving and decoding data.

BACKGROUND

Alternative transmission and encoding techniques have been considered in order to support a larger number of devices and communications for future wireless communications systems. Different data encoding techniques, such as sparse code multiple access (SCMA), have been proposed as improvements over existing code division multiple access (CDMA) schemes. In SCMA systems, binary data streams are encoded directly to multi-dimensional codewords to spread data over multiple subcarriers or resource elements. Because of the sparse encoding of data, decoding techniques such as a message passing algorithm (MPA) may be used. The complexity of the MPA increases, however, as the number of users and communications increase.

SUMMARY

According to one embodiment of the present disclosure, there is provided a method for decoding data. The method includes receiving a signal carrying multiple sparsely encoded data sequences; selecting a first plurality of the multiple sparsely encoded data sequences; and performing multi-user decoding on the received signal to decode the first plurality of the received sparsely encoded data sequences.

According to one embodiment of the present disclosure, there is provided a wireless device consisting of a communications interface; a processor; and one or more non-transitory computer readable media having computer readable instructions stored thereon for transmitting and receiving data through the communications interface. The instructions, when executed by the processor, direct the wireless device to: receive a signal carrying multiple sparsely encoded data sequences; select a first plurality of sparsely encoded data sequences; and perform multi-user decoding on the received signal to decode the first plurality of the received sparsely encoded data sequences.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. Although aspects of the invention will be described in conjunction with the illustrated embodiments, it will be understood that it is not intended to limit the invention to such embodiments.

DETAILED DESCRIPTION OF EXAMPLE EMBODIMENTS

Sparse code multiple access (SCMA) is a coding technique that employs non-orthogonal multiplexing of code layers, resource overloading, and spreading over multiple subcarriers to enable multiple access through the use of different codebooks for different multiplexed layers. Such coding and multiple access techniques may be used to support greater amounts of data traffic in a wireless communications system as the demand for communications systems grows and as systems evolve. In particular, wireless communications networks may be expected to support an increased number of low data rate devices or machine-type communications (MTC). SCMA data streams carry data encoded using a multidimensional codeword rather than a quadrature amplitude modulation (QAM) symbol mapping. The sparsity of the SCMA codebooks limits the number of collisions for a particular resource element when multiple data communications are received and decoded by a receiver in the wireless communications network. The term collision, as used herein, refers to the occurrence of multiple non-zero elements on a particular wireless communications shared resource element. The resource element may be a time, a frequency, or a combination of a time and frequency element. A resource element may also be referred to as a tone or subcarrier. The sparsity of the SCMA codebooks and lower number of collisions enables the use of receivers with a lower complexity multi-user decoding algorithm, such as an iterative message passing algorithm (MPA). Although example embodiments are described herein with respect to SCMA systems, the present disclosure may also be applied to other sparsely encoded, codeword based systems.

Figure 1:
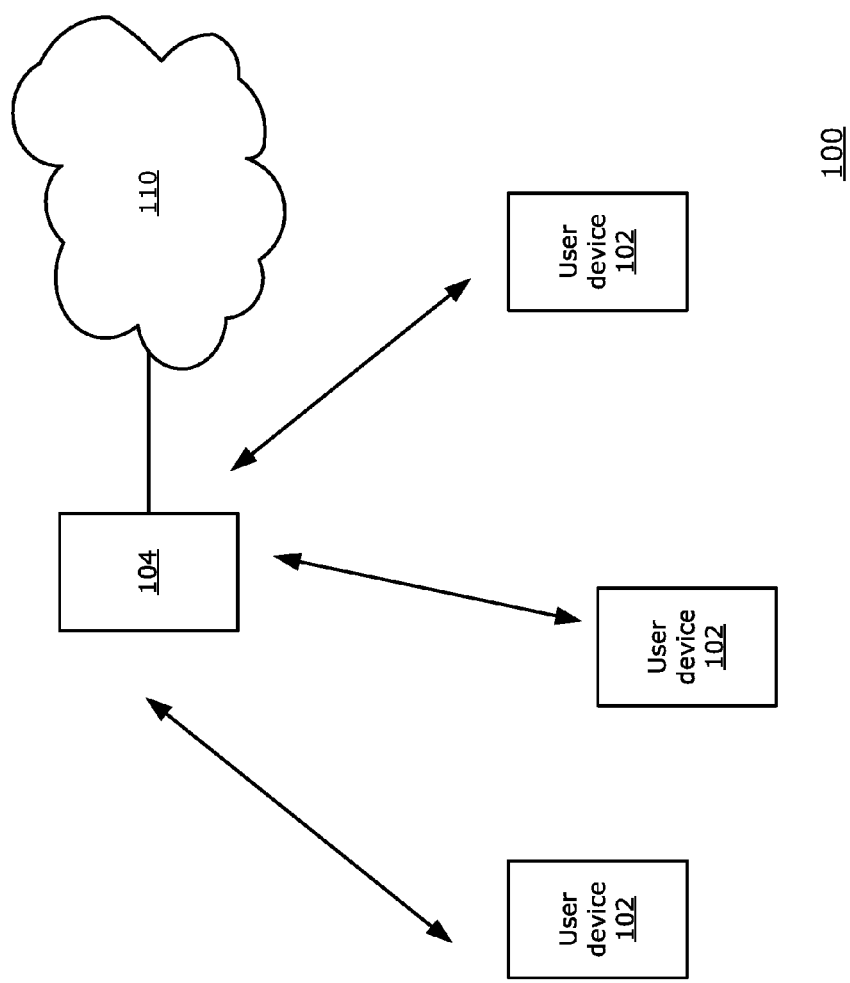
FIG. 1 is a block diagram illustrating an example communications system in accordance with one implementation of the present disclosure.

FIG. 1 illustrates a communications network 100 comprising a plurality of user devices 102 and a reception point 104. The reception point 104 may implement the apparatuses and methods described herein for receiving and decoding wireless communications. The network 100 may operate according to one or more communications or data standards or technologies including but not limited to fourth generation (4G) or next generation telecommunications networks, Long-Term Evolution (LTE), Universal Mobile Telecommunications System (UMTS), and other wireless or mobile communications networks. The user device 102 is generally any device capable of providing wireless communications such as a user equipment (UE), wireless transmit/receive unit (WTRU), mobile station (MS), mobile terminal, smartphone, cellular telephone, sensor, or other wireless enabled computing device.

The reception point 104 may comprise a base station (BS), evolved NodeB (eNB), access point, or other network node which functions as a wireless reception point for user devices 102 in the network 100. The reception point 104 may also operate as a transmission point to send data to the user devices 102. The reception point 104 may be part of a centralized or cloud radio access network (C-RAN) and thus may consist of separate remote radio heads and baseband processing units (not shown). The reception point 104 is connected to a backhaul network 110 which enables data to be exchanged between the reception point 104 and other remote networks, nodes, reception points, transmission points, and user devices (not shown). In networks 100 which support coordinated multi-point (CoMP) communications, multiple reception points 104 may operate jointly as a virtual reception point for a user device 102.

The reception point 104 may support communications with each user device 102 by establishing uplink and downlink communications channels with each user device 102. Communications in the network 100 may be scheduled by the reception point 104 or by a scheduling or management entity (not shown) in the network 100. The network 100 may support both scheduled and unscheduled communications. Unscheduled communications may be particularly suitable for low data rate communications where reduced overhead is preferred. Unscheduled communications may also be suitable for communications which require reduced latency.

Communications between the user device 102 and the reception point 104 may be implemented by the user device 102 encoding data to be transmitted using SCMA encoding techniques. For scheduled uplink communications, the number of collisions per resource element may be controlled by different codebooks or layers being assigned to different user devices 102. In some embodiments, multiple codebooks or layers may be assigned to one user device 102. For unscheduled uplink communications, each user device 102 may select, for example randomly, a codebook or a subgroup of codebooks from a group of designated codebooks for encoding and transmitting data. Thus, the number of collisions per resource element is not controlled and the reception point 104 may receive communications from multiple user devices 102 which have encoded data using the same codebook. The complexity of the receiver may have to be increased in order to receive and decode a signal carrying data sequences with a potentially high number of collisions. This complexity may not be acceptable or sufficient to decode multiple data sequences with too many collisions on a particular resource element.

The methods and apparatuses described herein may be used to help reduce the complexity of decoding multiple sparsely encoded data sequences in a received signal where the multiple sparsely encoded data sequences may have a high number of collisions. Instead of decoding all of the sparsely encoded data sequences which have contributed to a received signal, a first plurality of the sparsely encoded data sequences is selected. A multi-user decoding algorithm, such as MPA, is used to decode the first plurality of the received sparsely encoded data sequences. The sparsely encoded data sequences which are not part of the first plurality of sequences are treated as noise. The sparsely encoded data sequences which have been successfully decoded are identified. The received signal is modified to remove the signal contributions from the successfully decoded data sequences. If a user device 102 has been assigned multiple codebooks, and has transmitted multiple sparsely encoded data sequences, the received signal is modified to remove the signal contribution from only the sparsely encoded data sequences transmitted by that user device 102 that have been successfully decoded. A second plurality of sparsely encoded data sequences is selected from the remaining sparsely encoded data sequences. The selected data sequences may be a subset of one or more of the sparsely encoded data sequences which have not been successfully decoded. The second plurality may include sparsely encoded data sequences which were part of the first plurality, but not successfully decoded, as well as sparsely encoded data sequences which were not selected as part of the first plurality. Multi-user decoding is then performed on the modified received signal for the second plurality of sparsely encoded data sequences. The actions of selecting a plurality of sparsely encoded data sequences, decoding the plurality of sparsely encoded data sequences, and modifying the received signal to exclude the signal contributions from the successfully decoded data sequences may be performed iteratively until a stopping condition is satisfied. After the stopping condition is satisfied, an output is generated with the decoded bits for the multiple sparsely encoded data sequences.

The plurality of sparsely encoded data sequences may be selected such that a collision threshold of the decoding algorithm is not exceeded. The collision threshold is the maximum number of collisions which may occur on any one resource element and the multiple sparsely encoded data sequences in the received signal can still be decoded. Assuming a worst-case scenario where each user device 102 has encoded and transmitted a data sequence with a non-zero element on the same resource element, the collision threshold is effectively the maximum number of sparsely encoded data sequences that may be decoded.

Figure 2:
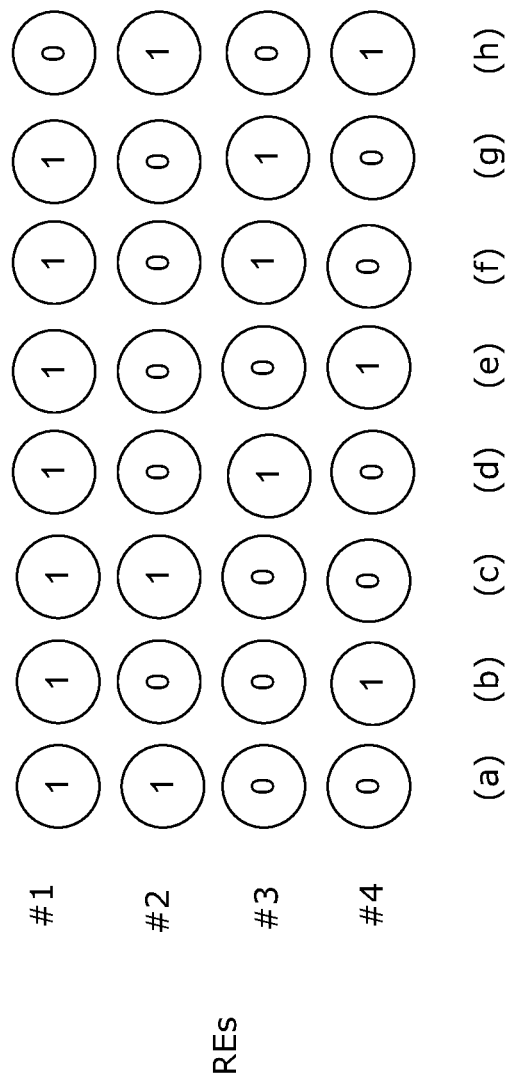
FIG. 2 is a diagram illustrating representative data sequences transmitted by multiple user devices in a communication system in accordance with one implementation of the present disclosure.

To further illustrate the collision threshold, FIG. 2 is a diagram with representative data sequences from multiple user devices which may be received in a signal at the reception point 104. FIG. 2 illustrates four resource elements (REs), numbered #1 to #4, for eight data sequences (a) to (h) received from multiple user devices 102 in the network 100. Non-zero elements are represented by a "1". Data sequences (a) and (c) have both been encoded using the same first codebook. Data sequences (b) and (e) have both been encoded using the same second codebook. Data sequences (d), (f), and (g) have all been encoded using the same third codebook. Seven of the eight data sequences have a non-zero element and thus collide on resource element #1. If the receiver and its decoding algorithm have a collision threshold of six, the receiver would not be able to decode all of the eight data sequences in the received signal. In this example, and according to embodiments described herein, a plurality of data sequences is selected so that only a maximum of six collisions may potentially occur. As described in further detail below, the selection of sparsely encoded data sequences may be made randomly or may be based on additional factors such as the contribution of each sparsely encoded data sequence to potential collisions on one or more resource elements, signal quality metrics associated with each sparsely encoded data sequence, knowledge of resource element scheduling information, knowledge of the codebook assigned to each user device 102, or a combination of these factors. In one example, if the plurality of data sequences is selected randomly, up to six sequences may be selected. The example collision threshold of six is met in this example, even if sequences (a) to (f) are part of the first plurality. In another example, if the plurality of data sequences is selected based on the contribution of each data sequence to potential collisions on one or more resource elements, the total number of selected sequences may exceed the collision threshold of the receiver. In this example, the seven data sequences (b) to (h) are part of the first selected plurality of data sequences. The example collision threshold of six is met in this example because only the six sequences (b) to (g) contribute to the collision on resource element #1. Data sequence (h) may be part of the first selected plurality of data sequences and six out of the seven sequences (a) to (g) may be selected as part of the first plurality of data sequences based on one or more factors such as a signal quality metric associated with the data sequences, a random selection, or a contribution of the data sequences to collisions on other resource elements.

Thus, by iteratively decoding a selected plurality of data sequences, a higher threshold number of collisions in the received signal may be tolerated by the receiver. The methods and apparatuses described herein may be used for unscheduled communications in which, for example, the user device 102 randomly selects the codebook used to encode and transmit data. As noted above, in this embodiment, the number of collisions per resource element is not controlled or limited. The methods and apparatuses described herein may also be used for scheduled communications in which the user device 102 has been assigned a resource allocation for an uplink communication and one or more codebooks to use for encoding data. In this embodiment, although the number of potential collisions may be controlled through the scheduling of communications and assignment of codebooks, as the number of user devices 102 and uplink communications increase, the minimum possible number of collisions per resource element may increase to the extent that it cannot be kept below the receiver's collision threshold. In some embodiments, the user device 102 may be assigned a codebook by a scheduling entity in the network 100. The codebook is used by the user device 102 to encode and transmit data, but the resource elements for the uplink communication may not be scheduled. In this embodiment, potential collisions exist depending on which user devices 102 are active and sending unscheduled transmissions. The number of user devices 102 and uplink communications which may be supported by the reception point 104 may thus be increased, and the collisions may be handled as described above.

Figure 3:
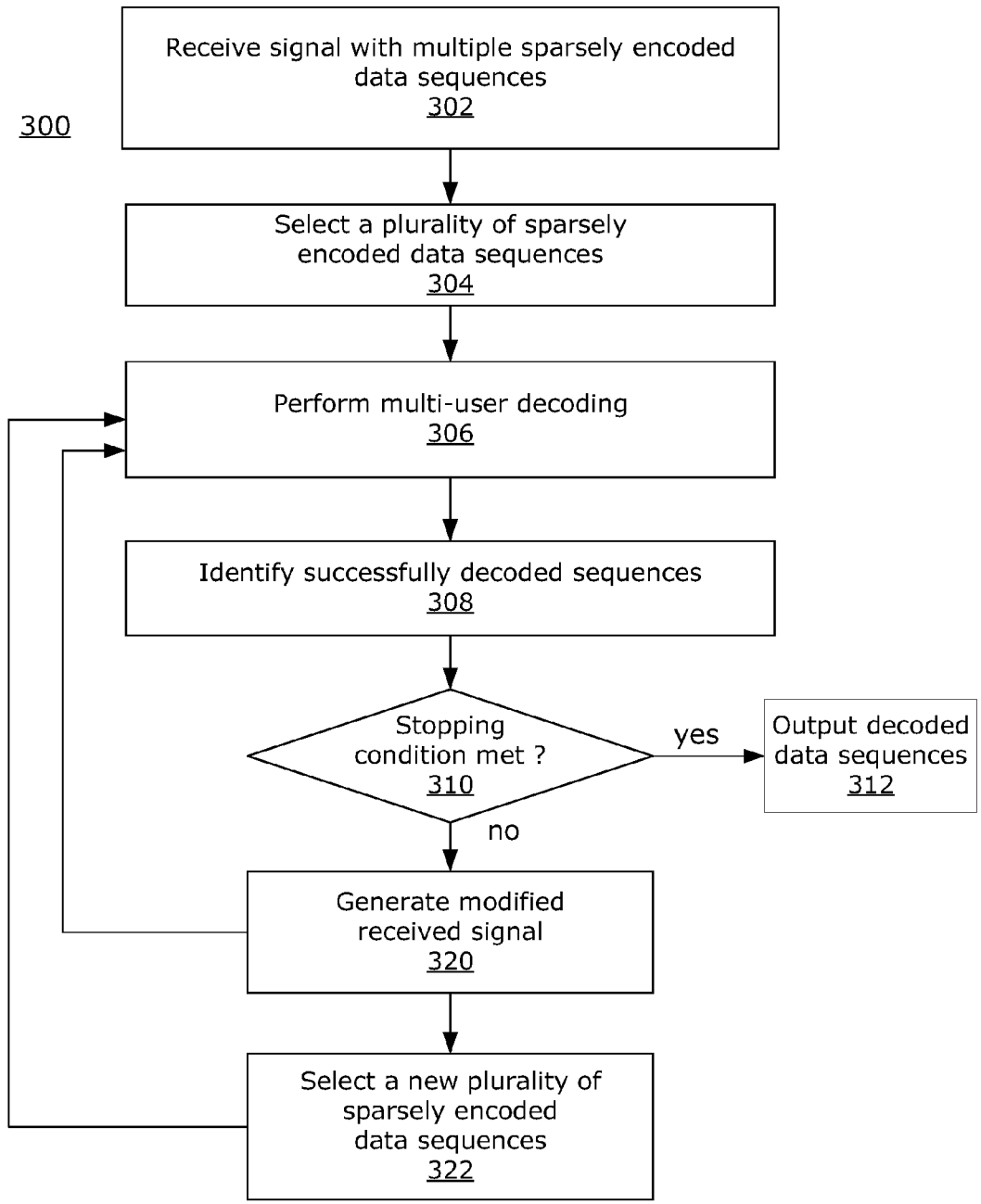
FIG. 3 is a flowchart illustrating a method in accordance with one implementation of the present disclosure.

FIG. 3 illustrates an example method 300 for decoding a received uplink communication signal according to embodiments of the present disclosure. At step 302, a reception point 104 receives a signal which includes multiple sparsely encoded data sequences, such as multiple SCMA codewords. At step 304, a first plurality of sparsely encoded data sequences is selected.

In some embodiments, selecting the first plurality of sparsely encoded data sequences includes first detecting in the received signal the user devices 102 which are active and have transmitted data. Detecting the user devices 102 includes detecting the codebooks which have been used for the uplink communications. If the received signal is for uplink communications which have been scheduled for a particular resource allocation, the user devices 102 and assigned codebooks may already be known from the scheduling information. In other embodiments, the assigned codebooks may be known and it is only necessary to detect which user devices 102 are active. The first plurality of sparsely encoded data sequences is selected from the set of active user devices 102.

In one embodiment, the first plurality of sparsely encoded data sequences may be randomly selected. In other embodiments, the first plurality of sparsely encoded data sequences is selected based on a collision contribution which consists of the estimated contribution of each sparsely encoded data sequence to the potential collisions on one or more resource elements. This contribution may be estimated based on the received signal, channel estimates, detected or known user devices 102, and detected or known codebooks. In some embodiments, one or more signal quality metrics are used in selecting the plurality of sparsely encoded data sequences. For example, sparsely encoded data sequences associated with a higher signal to noise ratio (SNR) may be selected for decoding before sparsely encoded data sequences associated with a lower SNR. In some embodiments, the first plurality of sparsely encoded data sequences may be selected based on a combination of the collision contribution and signal quality metrics. In one embodiment, the collision contribution of each sparsely encoded data sequence is given the most weight in determining the selected plurality of sparsely encoded data sequences and the signal quality metrics are considered with less weight. In one embodiment, if linear spreading is used in the transmitter of the user devices 102, then sparsely encoded data sequences associated with a higher signal to interference-plus-noise noise ratio (SINR) may be selected for decoding before sparsely encoded data sequences having a lower SINR. In one embodiment, the first plurality of sparsely encoded data sequences is selected based on a linear post-processing SINR.

In some embodiments, selecting (304) the first plurality of sparsely encoded data sequences includes determining an ordered list of sparsely encoded data sequences based on the collision contribution of each sparsely encoded data sequences, associated signal quality metrics, resource element scheduling information, assigned codebook information, or combinations thereof. The sparsely encoded data sequences may be ordered starting with the sparsely encoded data sequences which are the best candidates for decoding. In the example of FIG. 2, data sequence (h) may be listed first in the order based on a determination that data sequence (h) has the lowest contribution to potential collisions. The eight data sequences (a) to (h) in FIG. 2 can be ranked in order, and the first seven data sequences can then be selected for decoding as part of the first plurality of data sequences.

At step 306, multi-user decoding is performed on the received signal to decode the sparsely encoded data sequences in the first selected plurality. The multi-user decoding may be performed using an MPA algorithm or a maximum likelihood (ML) algorithm or any other algorithm which is subject to a threshold on the number of collisions per tone. For this decoding action, the sparsely encoded data sequences which are not part of the selected plurality are treated as noise. In one embodiment, for each resource element, the noise-plus-interference power is used by the decoding algorithm instead of using the noise power. The interference power is potentially different on different resource elements because the interference contribution of the data sequences which are not part of the selected plurality is sparse over the resource elements. In one embodiment, when the reception point 104 has more than one receive antenna, the covariance matrix of the interference term is used instead of the vector of interference powers over the multiple antennas. In one embodiment, for the first selected plurality of sparsely encoded data sequences, the decoding is based on the received signal, estimated channel coefficients, and a priori probabilities of SCMA codeword symbols. The multi-user decoding outputs soft values or log-likelihood ratios (LLRs) of the forward error correction (FEC) coded bits of the selected plurality of sparsely encoded data sequences. An FEC-decoding is then performed on this output and the decoded bits are generated for each data sequence in the selected plurality. In some embodiments, a posteriori probabilities of the SCMA codeword symbols are also generated.

At step 308, the sparsely encoded data sequences in the selected plurality which have been successfully decoded are identified. In one embodiment, this step 308 includes performing a cyclic redundancy check (CRC) of the FEC-decoded bits. A list of the sparsely encoded data sequences which have been successfully decoded may be generated. A successfully decoded data sequence consists of a data sequence which has been determined to within an acceptable level of accuracy or error tolerance, such as with an acceptable block error rate (BLER). The step 308 of identifying the sparsely encoded data sequences which have been successfully decoded may include generating the decoded output bits for each successfully decoded data sequence with the CRC bits removed.

At step 310, a check is performed to determine whether a stopping condition is met. The stopping condition may be based on the number of times the multi-user decoding has been performed, the number of data sequences that have been successfully decoded, or a combination thereof. If the stopping condition is met, an output of the decoded data sequences with the CRC bits removed is output (step 312).

If the stopping condition is not met, the method 300 continues. At step 320, a modified received signal is generated based on the data sequences that have been successfully decoded. In one embodiment, the modified received signal is generated using successive interference cancellation (SIC) techniques. The signal for each user device 102 for which sparsely encoded data sequences have been successfully decoded is regenerated based on the decoded bits and the estimated channel coefficients. In the first iteration of step 320, these regenerated signals are subtracted from the received signal to create a modified received signal. In subsequent iterations of step 320, the regenerated signals are subtracted from the modified received signal of the previous iteration to update the modified received signal.

If the stopping condition is not met, at step 322, a second or additional plurality of sparsely encoded data sequences is selected from the remaining sparsely encoded data sequences. The remaining sparsely encoded data sequences may include sparsely encoded data sequences which were not selected as part of the first plurality, as well as sparsely encoded data sequences which were part of the first plurality but which were not successfully decoded. The sparsely encoded data sequences for the second or additional pluralities may be selected based on the collision contribution of each remaining sparsely encoded data sequence, signal quality metrics associated with the remaining sparsely encoded data sequences, resource element scheduling information, assigned codebook information, or combinations thereof, as described above. In embodiments where an ordered list of sparsely encoded data sequences has been generated, and, for example, where the decoding algorithm has a collision threshold of six, the next six or more data sequences are selected from the list. Although shown sequentially in FIG. 3, it will be appreciated that at least steps 320 and 322 may be performed in a different order or at the same time.

As shown in FIG. 3, the method 300 continues with performing the multi-user decoding algorithm on the modified received signal (step 306) to decode the sparsely encoded data sequences for the second or additional plurality of sparsely encoded data sequences. For the second or subsequent decoding steps 306, the decoding may be based on the modified received signal, the channel coefficients, and a posteriori probabilities of the SCMA codeword symbols from previous iterations. Sparsely encoded data sequences which have not been selected as part of the second or additional plurality, and which have not already been successfully decoded and removed from the modified received signal, are treated as noise. As described above, the multi-user decoding outputs LLRs of the FEC coded bits of the sparsely encoded data sequences. An FEC-decoding is then performed on this output. The decoded bits for each data sequence in the second or additional plurality are generated. A posteriori probabilities of the SCMA codeword symbols may also be updated.

Step 308, as described above, is repeated to identify the sparsely encoded data sequences in the second plurality which have been successfully decoded. The list of the sparsely encoded data sequences which have been successfully decoded is updated. If the stopping condition is met, outputs are generated (step 312) as described above. If the stopping condition is not met, the method 300 continues with updating the modified received signal (step 320) to remove the successfully decoded data sequences for the current iteration. A new plurality of sparsely encoded data sequences is selected (step 322), and the multi-user decoding algorithm is performed (step 306) for the new plurality and the updated, modified received signal.

Figure 4:
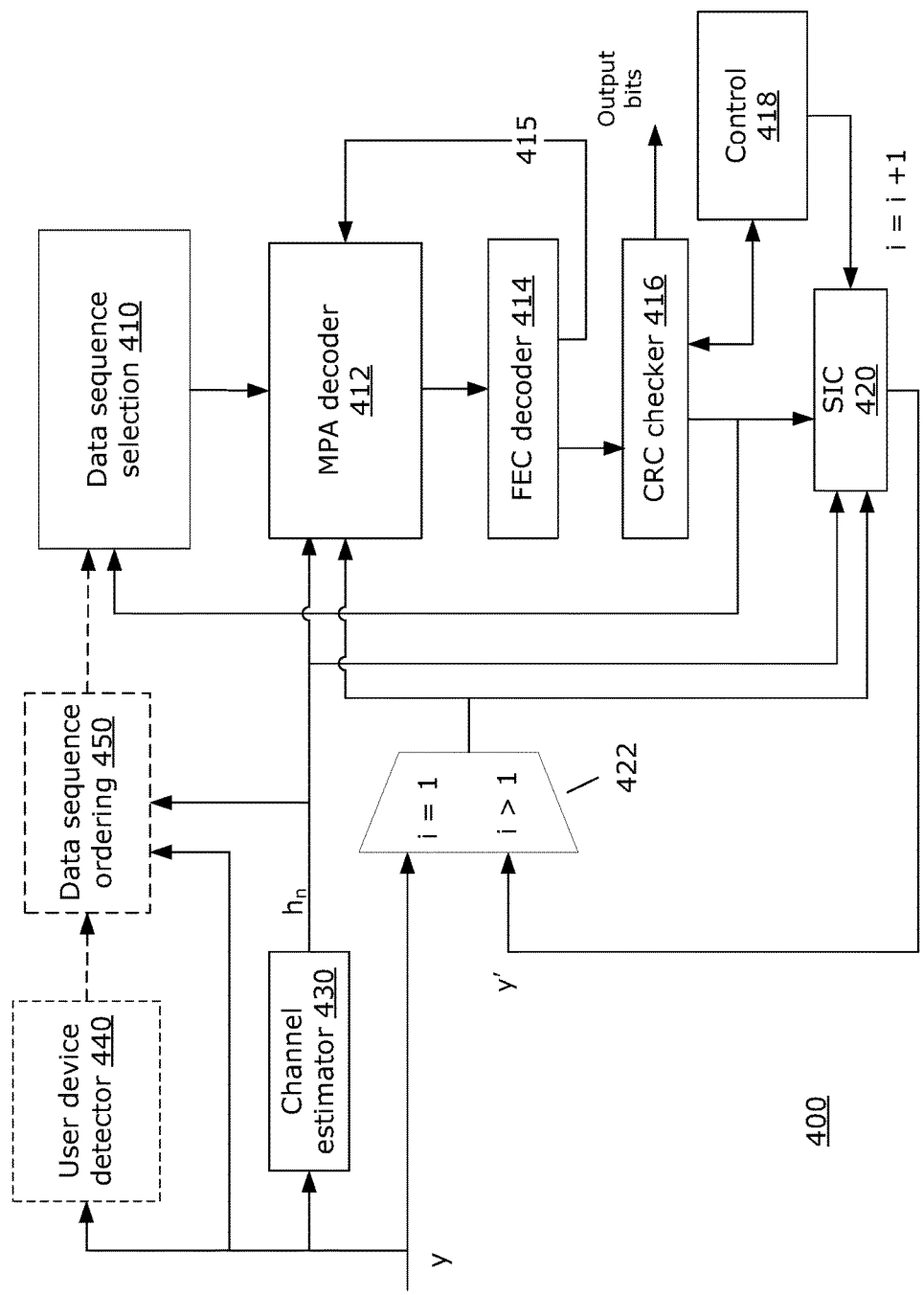
FIG. 4 is a block diagram illustrating a receiver in accordance with one implementation of the present disclosure.

FIG. 4 illustrates a block diagram of a portion of a receiver 400 according to one embodiment of the present disclosure. The receiver 400 may be part of the processing system 500 described below and illustrated in FIG. 5. It will be appreciated that the arrangement of elements in FIG. 4 is illustrative only and the receiver 400 may include multiple elements in different arrangements. The elements in FIG. 4 may also be implemented through various hardware components and software modules for implementing the actions of the methods described herein. The receiver 400 includes a data sequence selection module 410, an MPA decoder 412, an FEC decoder 414 and a CRC checker 416 which are configured to decode multiple sparsely encoded data sequences carried by a received signal y. As described above, after a first plurality of sparsely encoded data sequences is selected by the data sequence selection module 410, multi-user decoding is performed by the MPA decoder 412 for the plurality of data sequences. The FEC decoder 414 generates FEC-decoded bits from the LLRs generated by the MPA decoder 412. The FEC decoder 414 may also generate a posteriori probabilities of the SCMA codeword symbols to output to the MPA decoder 412 for the next iteration, as shown by the link 415 in FIG. 4. The CRC checker 416 performs a CRC check to determine whether one or more sparsely encoded data sequences in the first plurality have been successfully decoded with an acceptable level of error. The results of the CRC checker 416 may be provided to a control module 418 which determines whether a stopping condition has been met. If the stopping condition has been met, the control module 418 may direct the CRC checker 416 to output bits for each successfully decoded data sequence. The control module 418 may also manage an iteration count i for the receiver 400. If the decoding has stopped and outputs are generated, the control module 418 resets the iteration count to 1. If the stopping condition has not been met, the control module 418 increments the iteration count (i=i+1). An SIC module 420 is configured to generate a modified received signal y' based on the sparsely encoded data sequences and associated user devices 102 identified by the CRC checker 416, the original received signal y and the channel estimates $h_n$, as described above for method 300 and step 320.

As shown in FIG. 4, a multiplexer 422, which may be part of the control module 418, is used to select whether the received signal y or the modified received signal y' is provided to the MPA decoder 412 and to the SIC module 420. For the first selected plurality of sparsely encoded data sequences and first iteration of the actions described herein (i=1), the multiplexer 422 passes the received signal y to the MPA decoder 412. The MPA decoder 412 uses the received signal y together with channel estimates $h_n$ provided by a channel estimator 430 to decode the data sequences in the first plurality. For the first selected plurality of sparsely encoded data sequences, the SIC module 420 generates the modified received signal y' as described above for step 320 of the method 300. For subsequent iterations (i>1), the multiplexer 422 passes the modified received signal y' to the MPA decoder 412. The SIC module 420 then generates or updates the modified received signal y' based on the modified received signal y' from the previous iteration, the channel estimates $h_n$, and the identification of sparsely encoded data sequences which have been successfully decoded in the current iteration.

As described above, the first plurality of sparsely encoded data sequences may be selected based on resource allocation and codebook assignment information which is known to the receiver 400. This information may be used by the data sequence selection module 410 to select the first plurality sparsely encoded data sequences. After the first iteration, the data sequences have been successfully decoded may be provided to the data sequence selection module 410 by the CRC checker 416. These data sequences may be removed from selection for any subsequent pluralities of data sequences.

In some embodiments, the receiver 400 includes a user device detector module 440 which is configured to detect the user devices 102 which are active and have transmitted data carried by the received signal y. The user device detector module 440 may also detect the codebooks which have been used to generate data sequences in the received signal. In some embodiments, a data sequence ordering module 450 uses the detected information along with the received signal y and the channel estimates $h_n$ to generate an ordered list of sparsely encoded data sequences. The list may be ordered starting with the sparsely encoded data sequences which are the best candidates for decoding. As described above, the ordered list may be generated based on the collision contribution of each sparsely encoded data sequence, signal quality metrics, resource element scheduling information, assigned codebook information, or combinations thereof. For the first iteration (i=1), the data sequences selection module 410 may select the first plurality of sparsely encoded data sequences based on the ordered list provided by the data sequence ordering module 450. For subsequent iterations (i>1), the data sequence selection module 410 may select a new plurality based on the data sequences which remain on the list after the data sequence which have been successfully decoded in the previous iteration have been removed.

Figure 5:
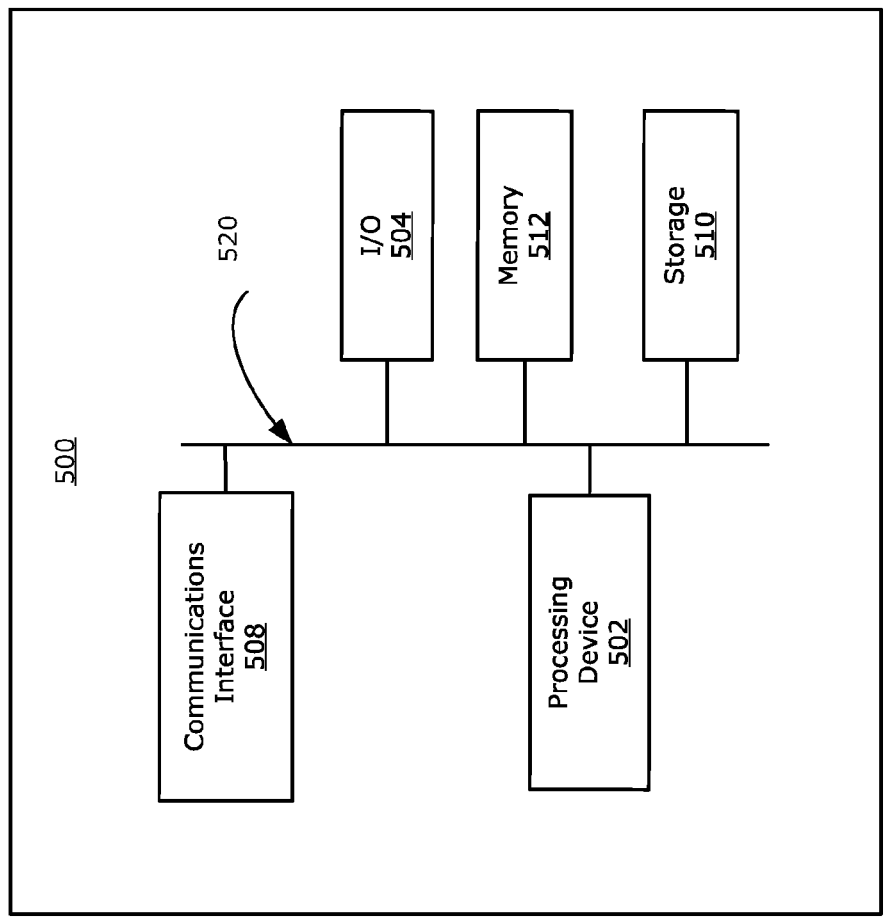
FIG. 5 is a block diagram illustrating a processing system in accordance with one implementation of the present disclosure.

FIG. 5 illustrates an example processing system 500, which may be used to implement methods and systems described herein, such as the reception point 104. Other processing systems suitable for implementing the present disclosure may be used, which may include components different from those discussed below. Although FIG. 5 shows a single instance of each component, there may be multiple instances of each component in the processing system 500.

The processing system 500 may include one or more processing devices 502, such as a processor, a microprocessor, a many-core processor, an application-specific integrated circuit (ASIC), a field-programmable gate array (FPGA), a dedicated logic circuitry, or combinations thereof. The processing system 500 may also include one or more input/output (I/O) interfaces 504, which may enable interfacing with one or more appropriate input devices and/or output devices (not shown). One or more of the input devices and/or output devices may be included as a component of the processing system 500 or may be external to the processing system 500. The processing system 500 may include one or more communication interfaces 508 for wired or wireless communication with a network, such as but not limited to, an intranet, the Internet, a P2P network, a WAN, LAN and/or a cellular or mobile communications network such as a 5G, 4G, LTE or other network as noted above. The communication interfaces 508 may include wired links (e.g., Ethernet cable) and wireless links (e.g., one or more antennas) for intra-network and/or inter-network communications. The communication interfaces 508 may provide wireless communication via one or more transmitters or transmit antennas, one or more receivers or receive antennas, and various signal processing hardware and software, including the receiver 400 illustrated in FIG. 4. The communication interfaces 508 may be configured for sending and receiving data to the backhaul network 110, or to other user devices, access points, network nodes, gateways or relays (not shown) in the network 100.

The processing system 500 may also include one or more storage units 510, which may include a mass storage unit such as a solid state drive, a hard disk drive, a magnetic disk drive and/or an optical disk drive. The processing system 500 may include one or more memories 512, which may include a volatile or non-volatile memory (e.g., a flash memory, a random access memory (RAM), and/or a read-only memory (ROM)). The non-transitory memories 512 may store instructions for execution by the processing devices 502, such as to carry out the present disclosure. The memories 512 may include other software instructions, such as for implementing an operating system and other applications/functions. In some examples, one or more data sets and/or modules may be provided by an external memory (e.g., an external drive in wired or wireless communication with the processing system 500) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 520 providing communication among components of the processing system 500, including the processing devices 502, I/O interfaces 504, communication interfaces 508, storage units 510 and/or memories 512. The bus 520 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, or simultaneously, as appropriate.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for decoding data comprising:
receiving a signal carrying multiple sparsely encoded data sequences;
performing multi-user decoding on the received signal to decode a selected first set of the received sparsely encoded data sequences;
when, after performing the multi-user decoding, there remains at least one sparsely encoded data sequence which has not been successfully decoded:
generating a modified received signal based on one or more sparsely encoded data sequences of the first set of sparsely encoded data sequences which have been successfully decoded; and
performing multi-user decoding on the modified received signal to decode a selected second set of the received sparsely encoded data sequences, the second set of the received sparsely encoded data sequences being selected from the at least one sparsely encoded data sequence which has not been successfully decoded.

2. The method of claim 1 wherein performing the multi-user decoding on the received signal to decode the first set of the received sparsely encoded data sequences comprises treating the received sparsely encoded data sequences which are not included in the first set as noise.

3. The method of claim 1 wherein selecting the first set of sparsely encoded data sequences comprises selecting the first set of sparsely encoded data sequences such that a number of collisions which occur on a resource element in the first set of sparsely encoded data sequences does not exceed a collision threshold for the multi-user decoding.

4. The method of claim 3 wherein selecting the first set of sparsely encoded data sequences comprises selecting the first set of sparsely encoded data sequences based on a collision contribution of each of the multiple sparsely encoded data sequences to potential collisions on any resource elements.

5. The method of claim 4 wherein selecting the first set of sparsely encoded data sequences comprises selecting the first set of sparsely encoded data sequences based on the collision contribution of each of the multiple sparsely encoded data sequences and a signal quality metric associated with each of the multiple sparsely encoded data sequences.

6. The method of claim 5 wherein the signal quality metric is a signal to noise ratio (SNR) or a linear post-processing signal to interference-plus-noise ratio (SINR).

7. The method of claim 3 further comprising:
generating an ordered list of the multiple sparsely encoded data sequences based on a collision contribution of each of the multiple sparsely encoded data sequences to potential collisions on any resource elements, and a signal quality metric associated with each of the multiple sparsely encoded data sequences;
wherein selecting the first set of sparsely encoded data sequences comprises selecting the first set of sparsely encoded data sequences based on the ordered list.

8. The method of claim 1 wherein performing the multi-user decoding on the modified received signal to decode the second set of sparsely encoded data sequences includes using a posteriori probability information obtained from performing the multi-user decoding on the received signal for the first set of sparsely encoded data sequences and treating any remaining sparsely encoded data sequence which is not included in the second set as noise.

9. The method of claim 1 wherein the second set of sparsely encoded data sequences are selected based on a linear post-processing signal to interference-plus-noise ratio (SINR) of the modified received signal.

10. The method of claim 1 wherein generating the modified received signal comprises generating the modified received signal using successive interference cancellation (SIC) to exclude, from the received signal, signal contributions from the one or more sparsely encoded data sequences which have been successfully decoded.

11. The method of claim 1 further comprising:
iteratively generating the modified received signal based on one or more sparsely encoded data sequences which have been successfully decoded, and performing multi-user decoding on the modified received signal to decode a selected new set of the received sparsely encoded data sequences, the new set of sparsely encoded data sequences being selected from at least one sparsely encoded data sequence which has not been successfully decoded, until a stopping criterion is met; and
outputting decoded bits for one or more of the multiple sparsely encoded data sequences.

12. The method of claim 1 wherein each sparsely encoded data sequence comprises a codeword selected from a sparse code multiple access (SCMA) codebook and wherein performing multi-user decoding on the received signal to decode the selected set of the received sparsely encoded data sequences comprises performing a message passing algorithm (MPA).

13. A wireless device comprising:
a communications interface;
a processor; and
one or more non-transitory computer readable media having computer readable instructions stored thereon for transmitting and receiving data through the communications interface, the instructions, when executed by the processor, direct the wireless device to:
receive a signal carrying multiple sparsely encoded data sequences;
perform multi-user decoding on the received signal to decode a selected first set of the received sparsely encoded data sequences;
when, after performing the multi-user decoding, there remains at least one sparsely encoded data sequence which has not been successfully decoded:
generate a modified received signal based on one or more sparsely encoded data sequences of the first set of sparsely encoded data sequences which have been successfully decoded; and perform multi-user decoding on the modified received signal to decode a selected second set of the received sparsely encoded data sequences, the second set of the received sparsely encoded data sequences being selected from the at least one sparsely encoded data sequence which has not been successfully decoded.

14. The wireless device of claim 13 wherein the instructions, when executed by the processor, direct the wireless device to perform the multi-user decoding by treating any of the multiple sparsely encoded data sequences which are not included in the first set as noise.

15. The wireless device of claim 13 wherein the instructions, when executed by the processor, direct the wireless device to select the first set of sparsely encoded data sequences such that a number of collisions which occur on a resource element in the first set of sparsely encoded data sequences does not exceed a collision threshold for the multi-user decoding.

16. The wireless device of claim 15 wherein the instructions, when executed by the processor, direct the wireless device to select the first set of sparsely encoded data sequences based on a collision contribution of each of the multiple sparsely encoded data sequences to potential collisions on any resource elements.

17. The wireless device of claim 16 wherein the instructions, when executed by the processor, direct the wireless device to select the first set sparsely encoded data sequences based on the collision contribution of each of the multiple sparsely encoded data sequences and a signal quality metric associated with each of the multiple sparsely encoded data sequences.

18. The wireless device of claim 17 wherein the signal quality metric is a signal to noise ratio (SNR) or a linear post-processing signal to interference-plus-noise ratio (SINR).

19. The wireless device of claim 13 wherein the instructions, when executed by the processor, further direct the wireless device to:

generate an ordered list of the multiple sparsely encoded data sequences based a collision contribution of each of the sparsely encoded data sequences to potential collisions on any resource elements, and a signal quality metric associated with each of the multiple sparsely encoded data sequences;

wherein the instructions, when executed by the processor, direct the wireless device to select the first set of sparsely encoded data sequences based on the ordered list.

20. The wireless device of claim 13 wherein the instructions, when executed by the processor, direct the wireless device to perform the multi-user decoding on the modified received signal to decode the second set of sparsely encoded data sequences using a posteriori probability information obtained from the multi-user decoding performed on the received signal for the first set of sparsely encoded data sequences and treating any remaining sparsely encoded data sequence which is not included in the second set as noise.

21. The wireless device of claim 13 wherein the instructions, when executed by the processor, further direct the wireless device to:

iteratively generate the modified received signal based on one or more sparsely encoded data sequences which have been successfully decoded, and perform multi-user decoding on the modified received signal to decode a selected new set of the received sparsely encoded data sequences, the new set of sparsely encoded data sequences being selected from at least one sparsely encoded data sequence which has not been successfully decoded, until a stopping criterion is met; and output decoded bits for one or more of the multiple sparsely encoded data sequences.

22. The wireless device of claim 13 wherein the wireless device is a reception point.

* * * * *